(12) United States Patent
Nagatomo

(10) Patent No.: US 9,635,430 B2
(45) Date of Patent: Apr. 25, 2017

(54) IMAGE STORING APPARATUS, IMAGE MANAGING METHOD AND COMPUTER READABLE RECORDING MEDIUM RECORDING PROGRAM THEREON

(71) Applicant: CASIO COMPUTER CO., LTD., Shibuya-ku, Tokyo (JP)

(72) Inventor: Shoichi Nagatomo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/804,080

(22) Filed: Jul. 20, 2015

(65) Prior Publication Data

US 2016/0037226 A1    Feb. 4, 2016

(30) Foreign Application Priority Data

Jul. 31, 2014  (JP) ................. 2014-156315

(51) Int. Cl.
| | |
|---|---|
| *H04N 5/225* | (2006.01) |
| *H04N 21/482* | (2011.01) |
| *H04N 5/77* | (2006.01) |
| *G06F 3/0481* | (2013.01) |
| *H04N 21/431* | (2011.01) |
| *H04N 21/81* | (2011.01) |
| *H04N 9/804* | (2006.01) |
| *G06F 17/30* | (2006.01) |

(52) U.S. Cl.
CPC ..... *H04N 21/4825* (2013.01); *G06F 3/04817* (2013.01); *G06F 17/3028* (2013.01); *G06F 17/30047* (2013.01); *H04N 5/772* (2013.01); *H04N 9/8042* (2013.01); *H04N 21/4312* (2013.01); *H04N 21/8153* (2013.01)

(58) Field of Classification Search
CPC ............ H04N 21/4825; H04N 9/8042; H04N 21/8153; H04N 21/43; H04N 21/4312; H04N 5/772; G06F 17/30047; G06F 17/3028; G06F 3/04817
USPC ............ 348/333.01, 207.1, 207.2, 552
See application file for complete search history.

(56) References Cited

U.S. PATENT DOCUMENTS

| | | | |
|---|---|---|---|
| 2009/0237513 A1* | 9/2009 | Kuwata | H04N 1/00236 348/207.1 |
| 2014/0078265 A1* | 3/2014 | Ohba | H04N 5/2628 348/47 |

FOREIGN PATENT DOCUMENTS

JP    2007067457 A    3/2007

* cited by examiner

*Primary Examiner* — Yogesh Aggarwal
(74) *Attorney, Agent, or Firm* — Holtz, Holtz & Volek PC

(57) ABSTRACT

In the case of receiving a request for list display of a plurality of images from a communication apparatus, an imaging apparatus acquires image data of a plurality of images recorded in a recording medium and analyzes a shooting mode or a relationship of each of the plurality of images with one or more other images referring to supplementary information such as Exif tag information of the image. In the case of determining that there are images taken in a continuous shooting mode or processed images acquired by performing copy or special processing, the imaging apparatus transmits an icon image for thumbnail for distinguishing the images to the communication apparatus via a predetermined wireless communication line. The communication apparatus receives image data of icon images for thumbnail transmitted by the imaging apparatus and list displays the received image data.

6 Claims, 6 Drawing Sheets

100

IMAGE STORING APPARATUS, IMAGE MANAGING METHOD AND COMPUTER READABLE RECORDING MEDIUM RECORDING PROGRAM THEREON

CROSS-REFERENCE TO RELATED APPLICATIONS

This application is based upon and claims the benefit of priority under 35 USC 119 of Japanese Patent Application No. 2014-156315 filed on Jul. 31, 2014, the entire disclosure of which is incorporated herein by reference in its entirety for all purposes.

BACKGROUND OF THE INVENTION

1. Field of the Invention

The present invention relates to an image storing apparatus, an image managing method and a computer readable recording medium for recording a program thereon.

2. Description of the Related Art

Conventionally, there has been known a technology of acquiring image data recorded in an external device via a network and displaying the image data in a display apparatus at hand (for example, Japanese Patent Application Laid-Open Publication No. 2007-067457 published on Mar. 15, 2007).

As described in the literature, images captured by a camera installed outside for monitoring are stored in a network digital recorder and a monitoring unit displays a list of thumbnails of the images stored in the recorder by launching a browser. In the case that a thumbnail is selected from the displayed list, the monitoring unit acquires an image corresponding to the selected thumbnail from the recorder and displays the acquired image.

SUMMARY OF THE INVENTION

According to an embodiment of the present invention, an image storing apparatus is provided. The image storing apparatus includes a recording section configured to record a plurality of images and supplementary information corresponding to each of at least one of the plurality of images which shows a shooting mode or whether or not the image is related to one or more other images, a communication section configured to communicate with an external device via a predetermined communication line, a first detecting section configured to detect a request for list display of the plurality of images recorded in the recording section from the external device through the communication by the communication section, and a first transmission control section configured to control the communication section to transmit an information image based on the supplementary information to the external device in the case that the first detecting section detects the request for list display.

According to an embodiment of the present invention, an image managing method is provided. The method is performed by an image storing apparatus including a recording section configured to record a plurality of images and supplementary information corresponding to each of at least one of the plurality of images which shows a shooting mode set at the time of shooting the image or whether or not the image is related to one or more other images and a communication section configured to communicate with an external device via a predetermined communication line. The method includes a detecting step of detecting a request for list display of the plurality of images recorded in the recording section from the external device through the communication by the communication section, and a transmitting step of transmitting an information image based on the supplementary information to the external device by the communication section in the case that the request for list display is detected at the detecting step.

According to an embodiment of the present invention, a non-transitory computer-readable recording medium for recording a program readable by a computer is provided. The computer is included in an image storing apparatus including a recording section configured to record a plurality of images and supplementary information corresponding to each of at least one of the plurality of images which shows a shooting mode set at the time of shooting the image or whether or not the image is related to one or more other images and a communication section configured to communicate with an external device via a predetermined communication line. The program controls the computer to function as a detecting section configured to detect a request for list display of the plurality of images recorded in the recording section from the external device through the communication by the communication section, and a transmission control section configured to control the communication section to transmit an information image based on the supplementary information to the external device in the case that the detecting section detects the request for list display.

BRIEF DESCRIPTION OF THE DRAWINGS

The present invention will more sufficiently be understood by the following detailed description and the accompanying drawings, which are, however, exclusively for explanation and do not limit the scope of the present invention.

Here.

DETAILED DESCRIPTION OF THE PREFERRED EMBODIMENT

Hereinafter, embodiments of the present invention will be described with reference to the accompanying drawings. The scope of the present invention should not be limited to the embodiments described here.

Figure 1:
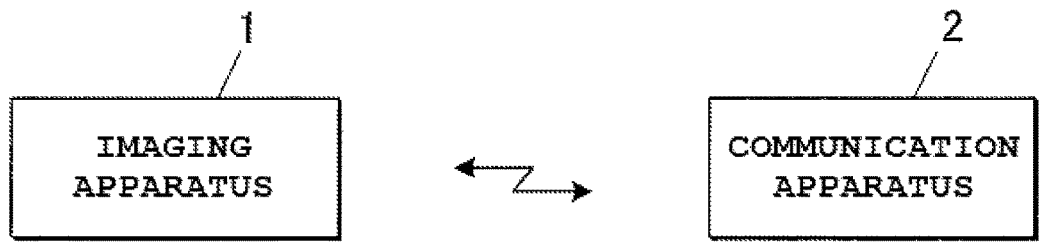
FIG. 1 shows a schematic configuration of an image management system according to one embodiment to which the present invention is applied.

FIG. 1 shows a schematic configuration of an image management system 100 according to one embodiment to which the present invention is applied.

As shown in FIG. 1, the image management system 100 of the present embodiment includes an imaging apparatus 1 (an image storing apparatus; see FIG. 2) and a communication apparatus 2 (an external device; see FIG. 3) and the imaging apparatus 1 and the communication apparatus 2 are connected via a wireless communication line (for example, wireless PAN (Personal Area Network) such as Bluetooth (Registered Trademark) and wireless LAN such as Wi-Fi (Registered Trademark)) so as to be able to communicate information with each other.

The imaging apparatus 1 and the communication apparatus 2 may be carried and used by one user or different users.

First, the imaging apparatus 1 is explained with reference to FIG. 2.

Figure 2:
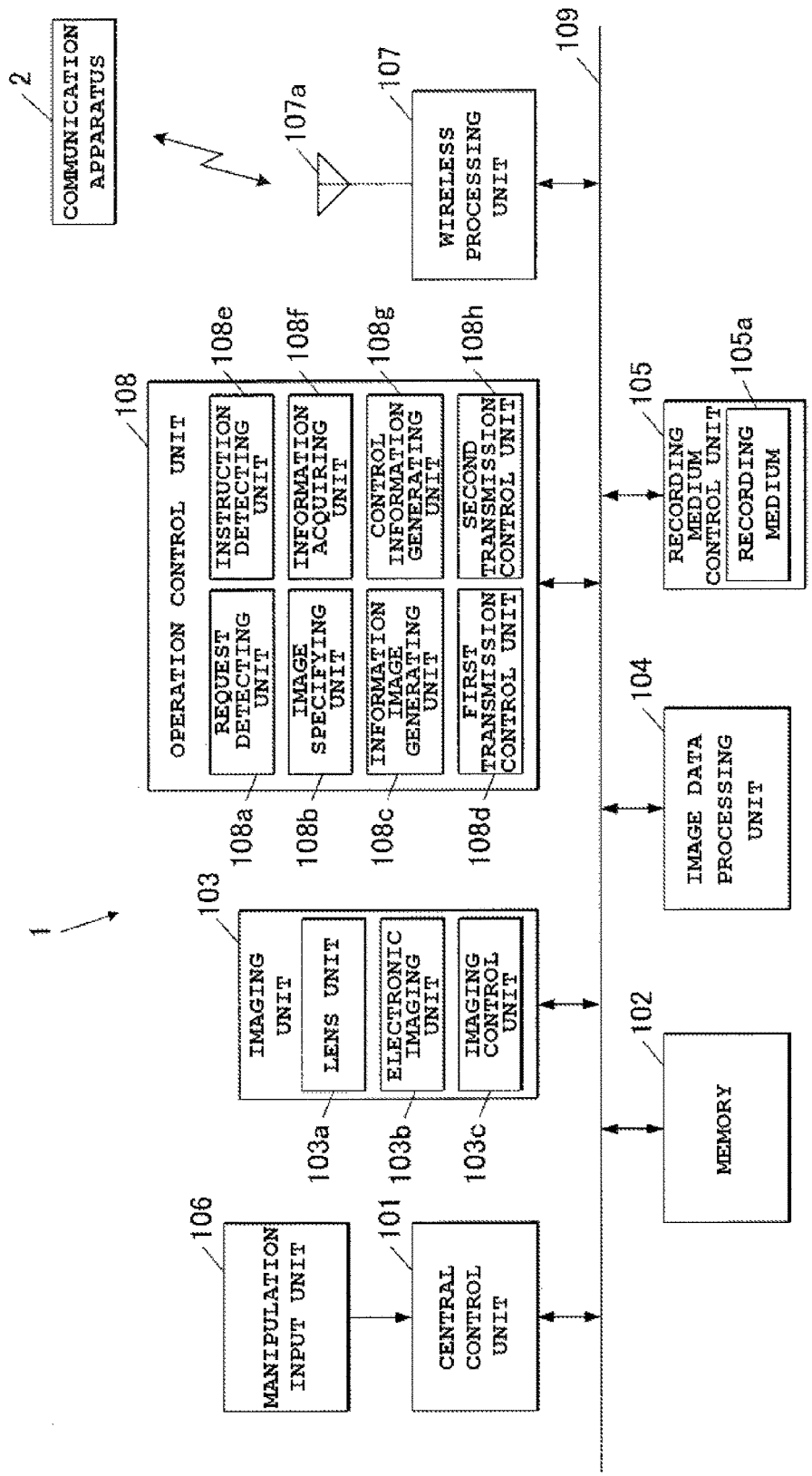
FIG. 2 is a block diagram showing a schematic configuration of an imaging apparatus included in the image management system of FIG. 1.

FIG. 2 is a block diagram showing a schematic configuration of the imaging apparatus 1 included in the image management system 100.

As shown in FIG. 2, the imaging apparatus 1 includes a central control unit 101, a memory 102, an imaging unit 103, an image data processing unit 104, a recording medium control unit 105, a manipulation input unit 106, a wireless processing unit 107, and an operation control unit 108.

The central control unit 101, the memory 102, the imaging unit 103, the image data processing unit 104, the recording medium control unit 105, the wireless processing unit 107, and the operation control unit 108 are connected via a bus line 109 with each other.

The central control unit 101 controls each unit of the imaging apparatus 1. More specifically, the central control unit 101 includes a CPU (Central Processing Unit), a RAM (Random Access Memory) and a ROM (Read Only Memory) which are not shown in the drawing, and performs various control operations according to various processing programs for the imaging apparatus 1 (which are not shown in the drawing).

The memory 102 includes, for example, a DRAM (Dynamic Random Access Memory) and temporarily stores data processed by each unit of the imaging apparatus 1 besides the central control unit 101.

The imaging unit 103 functions as an imaging means for capturing an image of a subject. More specifically, the imaging unit 103 includes a lens unit 103a, an electronic imaging unit 103b, and an imaging control unit 103c.

The lens unit 103a includes a plurality of lenses such as a zoom lens and a focus lens.

The electronic imaging unit 103b includes an image sensor such as a CCD (Charge Coupled Device) or a CMOS (Complementary Metal-oxide Semiconductor) and converts an optical image which has passed various lenses of the lens unit 103a into a two-dimensional image signal.

Further, the imaging unit 103 may include a diaphragm (not shown in the drawing) for regulating the amount of light that passes through the lens unit 103a.

The imaging control unit 103c controls imaging of the subject by the imaging unit 103. The imaging control unit 103c includes a timing generator, a driver, and the like (not shown in the drawing). Further, the imaging control unit 103c drives scanning of the electronic imaging unit 103b by the timing generator and the driver to convert an optical image formed by the lens unit 103a into a two-dimensional image signal every predetermined period by the electronic imaging unit 103b, reads out each frame image for one screen from an imaging area of the electronic imaging unit 103b and outputs the frame image to the image data processing unit 104.

The image data processing unit 104 generates image data of an image of the subject.

In other words, the image data processing unit 104 functions as a processing means and processes frame images captured by the imaging unit 103 sequentially. More specifically, the image data processing unit 104 adjusts gain of each color component of RGB for an analog signal of each frame image forwarded from the electronic imaging unit 103b. Then, the image data processing unit 104 executes sampling and holding by using a sample and hold circuit (not shown in drawing), executes conversion into digital data by using an A/D converter (not shown in drawing), and executes color processing including pixel interpolation processing and $\gamma$ correction processing by using a color processing circuit (not shown in drawing). After that, the image data processing unit 104 generates a digital brightness signal Y and color difference signals Cb and Cr (YUV data).

The image data processing unit 104 compresses the YUV data of the subject in a predetermined encoding format (such as the JPEG format, the Motion JPEG format or the MPEG format) and outputs the compressed data to the recording medium control unit 105.

In the case of displaying an image as requested by the communication apparatus 2, the image data processing unit 104 can decode still picture data or moving picture data relating to the image to be displayed which is read from the recording medium 105a by the recording medium control unit 105 in a corresponding encoding format and output the decoded data to the wireless processing unit 107. Alternatively, the image data processing unit 104 may output the compressed data to the wireless processing unit 107. The output image data is transmitted to the communication apparatus 2 via a communication antenna 107a.

The storage medium control unit 105 includes a detachable recording medium 105a and controls reading/writing of data from/to the recording medium 105a.

In other words, the recording medium control unit 105 allows image data for recording encoded in a predetermined compression format (such as the JPEG format, the Motion JPEG format or the MPEG format) by an encoding unit (not shown in drawing) of the image data processing unit 104 to be recorded in a predetermined recording area of the recording medium 105a.

More specifically, the recording medium control unit 105 allows a plurality of images captured by the imaging unit 103 and supplementary information corresponding to each of at least one of the plurality of images which shows a shooting mode set at the time of shooting the image or whether or not the image is related to one or more other images to be recorded in the recording medium (a recording means) 105a.

Here, the shooting mode can be one of a single shooting mode, a continuous shooting mode, a bracket shooting mode, and the like, for example.

For example, in the case that there is a processed image (for example, a bracket image) acquired by executing copy or a special process for an original image, the image is regarded as related to the original image. The bracket shooting mode is a kind of continuous shooting mode for performing shooting continuously while changing shooting conditions.

Thus, a plurality of images recorded in the recording medium 105a are related to other images by the supplementary information showing the shooting mode or the relationship with other image(s).

For example, in the case that the image data is recorded in the Exif format, the recording medium control unit 105 records Exif tag information as the supplementary information.

The recording medium 105a includes a non-volatile memory (a flash memory), for example.

The manipulation input unit 106 is used to carry out a predetermined manipulation of the imaging apparatus 1 and includes, for example, a power button for turning on/off power of the main body of the apparatus, a shutter button for instructing to image a subject, a selection button for instruction of selection of a shooting mode, a function, or the like, and/or a zoom button for instructing to adjust zoom (which are not shown in drawings). The manipulation input unit 106 outputs a predetermined manipulation signal to the central control unit 101 in accordance with manipulation of each of the buttons.

The wireless processing unit 107 performs control of information communication with an external device such as the communication apparatus 2 connected via a predetermined wireless communication line.

The wireless processing unit 107 functions as a communication means and communicates with the external device via a predetermined communication line (for example, wireless PAN (Personal Area Network) such as Bluetooth or wireless LAN such as Wi-Fi). More specifically, the wireless processing unit 107 includes, for example, a control module for performing wireless communication with the communication apparatus 2 via the communication antenna 107a. Further, the wireless processing unit 107 communicates device information and data of an authentication key with a communication counterpart by using a wireless signal, for example, by executing communication setting processing referred to as a pairing in advance. After that, connection with the communication counterpart is automatically or semi-automatically made and broken without executing the communication setting processing every time. For example, signal reception sensitivity or signal reception intensity is measured and, in the case that the imaging apparatus 1 is separated from the communication apparatus 2 by a distance to which radio waves cannot reach, the communication connection is broken. On the other hand, in the case that they close to each other so as to be in a range where radio waves can reach, the communication connection is automatically made. Alternately or additionally, the connection is semi-automatically made or broken by a manipulation of connection or disconnection.

The operation control unit 108 includes a request detecting unit 108a, an image specifying unit 108b, an information image generating unit 108c, a first transmission control unit 108d, an instruction detecting unit 108e, an information acquiring unit 108f, a control information generating unit 108g, and a second transmission control unit 108h.

Each unit of the operation control unit 108 includes a predetermined logic circuit. This configuration is just an example and not intended to limit the scope of the invention.

The request detecting unit 108a detects a request for list display of a plurality of images recorded in the recording medium 105a.

In other words, the request detecting unit (a first detecting means) 108a detects a request for display of a list of the plurality of images recorded in the recording medium 105a from the communication apparatus (the external device) 2 through the communication by the wireless processing unit 107. More specifically, in the case that the wireless processing unit 107 receives a list request instruction transmitted based on a predetermined manipulation of the communication apparatus 2 by a user via the wireless PAN or the wireless LAN, the request detecting unit 108a acquires the list request instruction received by the wireless processing unit 107 and detects the request for display of a list of the plurality of images.

The image specifying unit 108b specifies images related based on the supplementary information from the plurality of images.

In the case that the request for list display is detected by the request detecting unit 108a, the image specifying unit (a specifying means) 108b specifies images related based on the supplementary information from the plurality of images recorded in the recording medium 105a. More specifically, the image specifying unit 108b reads the supplementary information of each of the plurality of images from the recording medium 105a. For example, in the case that the shooting mode is the continuous shooting mode, the image specifying unit 108b specifies a predetermined number of images continuously recorded. Further, the image specifying unit 108b may specify a processed image (for example, a bracket image) which is acquired by executing copy or a special process for an original image.

The copy or the special process executed for the original image may be executed at the time of or after recording the image data.

The information image generating unit 108c generates an information image.

The information image generating unit (a first generating means) 108c generates an information image for showing that a plurality of images specified by the image specifying unit 108b are related to each other (for example, an icon image for thumbnail). More specifically, the information image generating unit 108c generates the information image according to a result of specification by the image specifying unit 108b, or in other words, according to relationships of the plurality of images based on the supplementary information.

Figure 6:
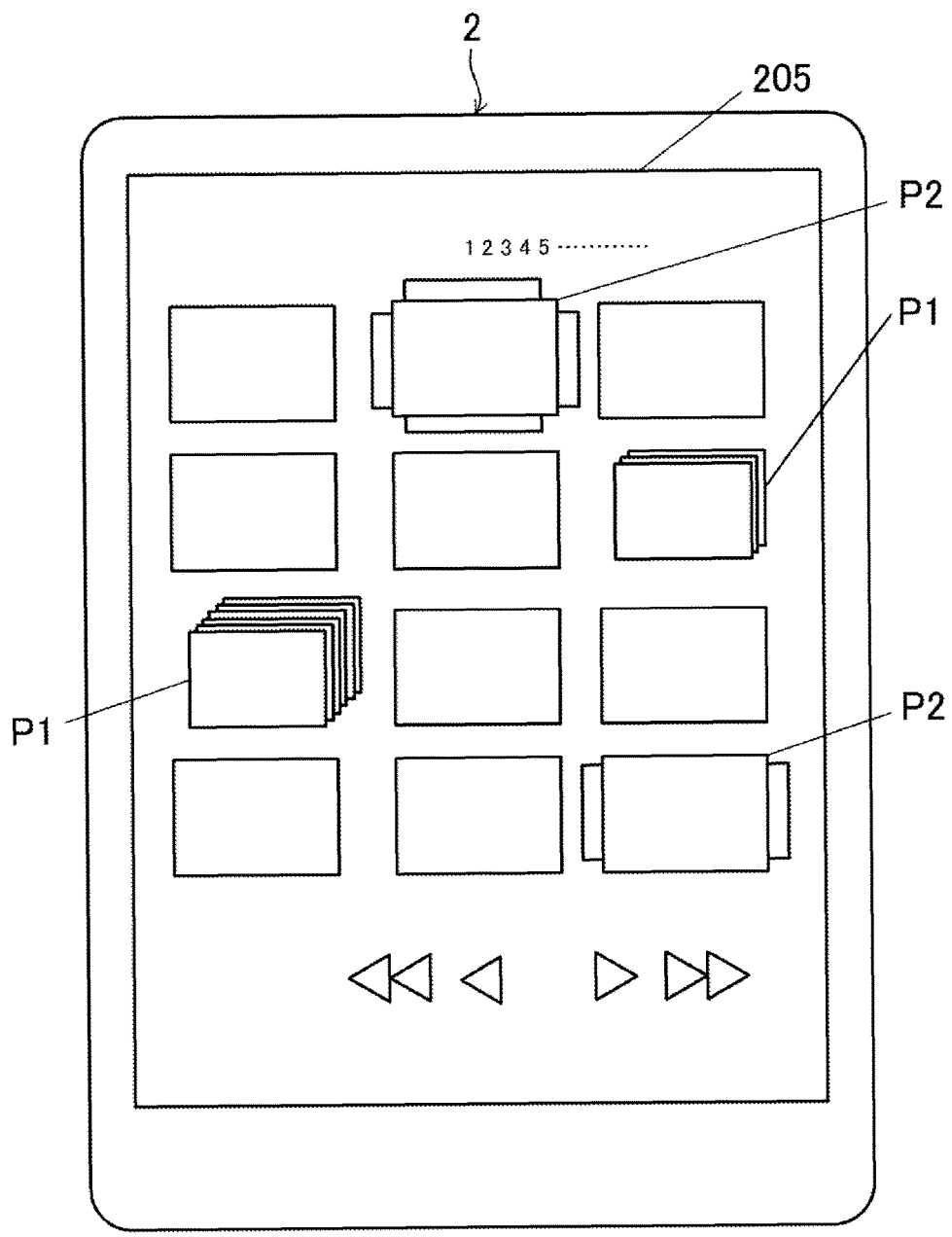
FIG. 6 is a schematic diagram showing an example of a display screen of a communication apparatus relating to the image management process of FIG. 4.

For example, as shown in FIG. 6, the information image generating unit 108c generates an information image P1 for distinguishing a plurality of images continuously recorded of a predetermine number from other images, an information image P2 for indicating a processed image acquired by processing one image which is an original image (for example, a bracket image), and the like. The information image P1 indicating the continuous shooting mode may be different according to the number of images continuously shot. For example, if the number of images continuously shot is greater, the information image may seem to have more images overlapped. The information image P2 indicating the bracket image may be a different image according to methods for changing shooting conditions. For example, the information image P2 differs between the case of changing only one shooting condition (for example, exposure) (shooting total three images) and the case of the second shooting condition (for example, white balance) in addition to the first shooting condition (shooting total nine images).

The first transmission control unit 108d controls the wireless processing unit 107 to transmit the information image to the communication apparatus 2.

The first transmission control unit (a first transmission control means) 108d controls the wireless processing unit 107 to transmit the information image generated by the information image generating unit 108c to the communication apparatus 2 (the external device). More specifically, the first transmission control unit 108d acquires image data of the information image generated by the information image generating unit 108c, and controls the wireless processing unit 107 to transmit the acquired image data of the information image to the communication apparatus 2 via the predetermined wireless communication line.

The instruction detecting unit 108e detects an instruction for performing a specific operation for the information image.

The instruction detecting unit (a second detecting means) 108e detects the instruction for performing a specific operation for the information image transmitted by the first transmission control unit 108d through communication by the wireless processing unit 107. More specifically, in the case that the wireless processing unit 107 receives a selection instruction for selecting an icon image for thumbnail (for example, the information images P1 and P2) including a display instruction for displaying a plurality of images transmitted based on a predetermined manipulation of the communication apparatus 2 by the user via the wireless PAN, the instruction detecting unit 108e acquires and detects the received display instruction from the wireless processing unit 107.

The display of a plurality of image is an example of the specific operation. However, the present invention is not limited to this and may be modified as appropriate.

The information acquiring unit (an acquiring means) 108f acquires information showing display performance of the communication apparatus (the external device) 2.

A browser generally indicates software for displaying a file explorer or a page on the Internet. The kind of the browser which can be operated by the communication apparatus 2 is different according to the kinds of terminal. Some kinds of browser can play music or movie on a display screen by inserting an auxiliary operations program such as a plug-in tool as well as display texts and output voices. Since the plug-in increases burdens of processing, a restriction may be imposed to running environments of the plug-in in the case that it is installed in the communication apparatus 2.

Therefore, for example, in the case that the wireless processing unit 107 receives information showing display performance of a display unit 205 of the communication apparatus 2 (hereinafter, also referred to as display performance information) transmitted from the communication apparatus 2 via the wireless PAN or the wireless LAN when the wireless processing unit 107 establishes a wireless communication line with the communication apparatus 2 or receives the list request instruction, the information acquiring unit 108f acquires the received display performance information from the wireless processing unit 107.

The control information generating unit 108g generates display control information for displaying a plurality of images related to each other by the information image in a distinguishable manner.

In the case that the instruction detecting unit 108e detects an instruction for performing a specific operation for the information image (for example, a display instruction for displaying a plurality of images), the control information generating unit (a second generating means) 108g generates the display control information for displaying a plurality of images related to each other by the information image in a distinguishable manner. More specifically, the control information generating unit 108g generates a plug-in tool (for example, a JAVA (Registered Trademark) plug-in) for displaying a plurality of images related to each other by the information image in a distinguishable manner according to the display performance of the display unit 205 of the communication apparatus 2 based on the display performance information acquired by the information acquiring unit 108f.

As used herein, the words "displaying a plurality of images related to each other by the information image in a distinguishable manner" means to display the plurality of images sequentially at a predetermined time interval, display a list of images by laying out downsized images of the plurality of images on one screen, or the like.

A technology well-known in the art can be applied to generate the plug-in tool and detailed description thereof is omitted here.

The second transmission control unit 108h controls the wireless processing unit 107 to transmit the display control information with the plurality of images to the communication apparatus 2.

The second transmission control unit (a second transmission control means) 108h controls the wireless processing unit 107 to transmit the display control information generated by the control information generating unit 108g with the plurality of images related to each other by the information image to the communication apparatus 2. More specifically, the second transmission control unit 108h acquires the plug-in tool generated by the control information generating unit 108g and image data of the plurality of images related to each other by the information image from the recording medium 105a. Further, the second transmission control unit 108h controls the wireless processing unit 107 to transmit the acquired plug-in tool and the image data of the plurality of images to the communication apparatus 2 via the predetermined wireless communication line.

Next, the communication apparatus 2 is explained with reference to FIG. 3.

Figure 3:
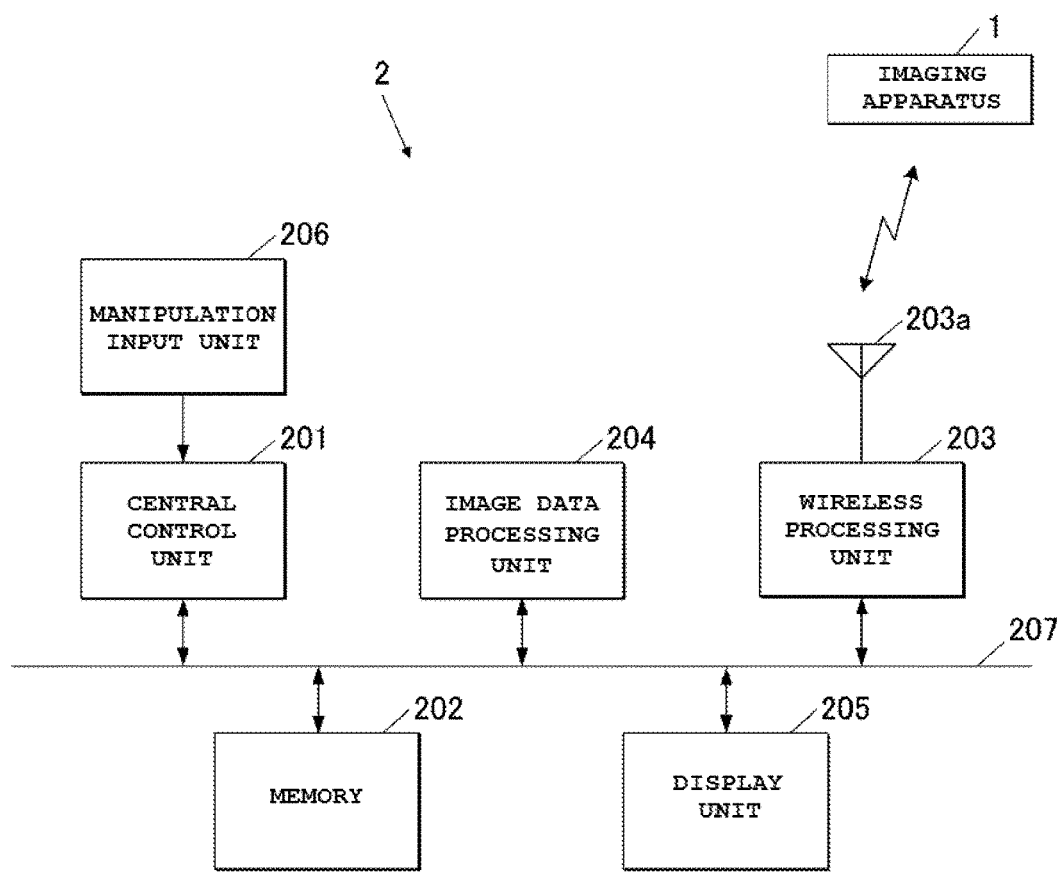
FIG. 3 is a block diagram showing a schematic configuration of a communication apparatus included in the image management system of FIG. 1.

FIG. 3 is a block diagram showing a schematic configuration of the communication apparatus 2 included in the image management system of FIG. 1.

As shown in FIG. 3, the communication apparatus 2 includes a central control unit 201, a memory 202, a wireless processing unit 203, an image data processing unit 204, the display unit 205, and a manipulation input unit 206.

The central control unit 201, the memory 202, the wireless processing unit 203, the image data processing unit 204, and the display unit 205 are connected via a bus line 207 with each other.

The central control unit 201 controls each unit of the communication apparatus 2. More specifically, the central control unit 201 includes a CPU (Central Processing Unit), a RAM (Random Access Memory) and a ROM (Read Only Memory) which are not shown in the drawing, and performs various control operations according to various processing programs for the communication apparatus 2 (which are not shown in the drawing).

The memory 202 includes, for example, a DRAM (Dynamic Random Access Memory) and temporarily stores data processed by each unit of the communication apparatus 2 besides the central control unit 201.

The wireless processing unit 203 performs control of information communication with an external device such as the imaging apparatus 1 connected via a predetermined wireless communication line.

The wireless processing unit 203 includes, for example, a control module for performing wireless communication with the imaging apparatus 1 via a communication antenna 203a. Since a structure and functions of the wireless processing unit 203 are almost the same as those of the wireless processing unit 107 of the imaging apparatus 1, detailed description thereof is omitted here.

The image data processing unit 204 performs various processing to image data of frame images received by the wireless processing unit 203 and outputs the image data to the display unit 205. For example, the image data processing unit 204 may enlarge/reduce the image data received by the wireless processing unit 203 to a predetermined size based on display resolution of a display panel 205*a* and output the image data to a display control unit 205*b*.

The display unit 205 includes, for example, an LCD and displays a variety of information on a display screen under control of the CPU of the central control unit 201.

More specifically, the display unit 205 generates an application screen based on execution of each of various application programs (not shown in the drawing) by the CPU of the central control unit 201, for example, and displays the generated application screen in a display area. Further, the display unit 205 can display a plurality of images sequentially on the application screen by executing an auxiliary operations program such as a plug-in tool.

Further, the display unit 205 generates the display performance information indicating display performance of the display unit 205 based on the kind of format of an image which can be displayed by the display unit 205, the kind of executable auxiliary operations program, and the like. The generated display performance information is acquired by the wireless processing unit 203 and transmitted to the imaging apparatus 1 via the wireless communication line.

Further, the application program may be, for example, an internet browser, image editing software, a file explorer, a digital camera control program, or the like. The application program may be previously stored in the ROM, or acquired by the wireless processing unit 203 via a communication network from an external device (which is not shown in the drawing).

The manipulation input unit 206 is used to carry out a predetermined manipulation of the communication apparatus 2 and includes, for example, a power button for turning on/off power of the main body of the apparatus, a shutter button for instructing to image a subject, and/or a selection button for instruction of selection of a shooting mode, a function, or the like (which are not shown in drawings). The manipulation input unit 206 outputs a predetermined manipulation signal to the central control unit 201 in accordance with manipulation of each of the buttons. More specifically, for example, in the case that a user performs a manipulation to request list display of the plurality of images recorded in the imaging apparatus 1, the manipulation input unit 206 outputs an instruction signal for requesting list display of the plurality of images to the central control unit 201. Further, in the case that the user performs a manipulation to request display of images recorded in the imaging apparatus 1 so as to correspond to the supplementary information, the manipulation input unit 206 outputs an instruction signal for requesting display of the images to the central control unit 201.

Next, an image management process performed by the image management system 100 will be described with reference to FIGS. 4 to 6.

Figure 4:
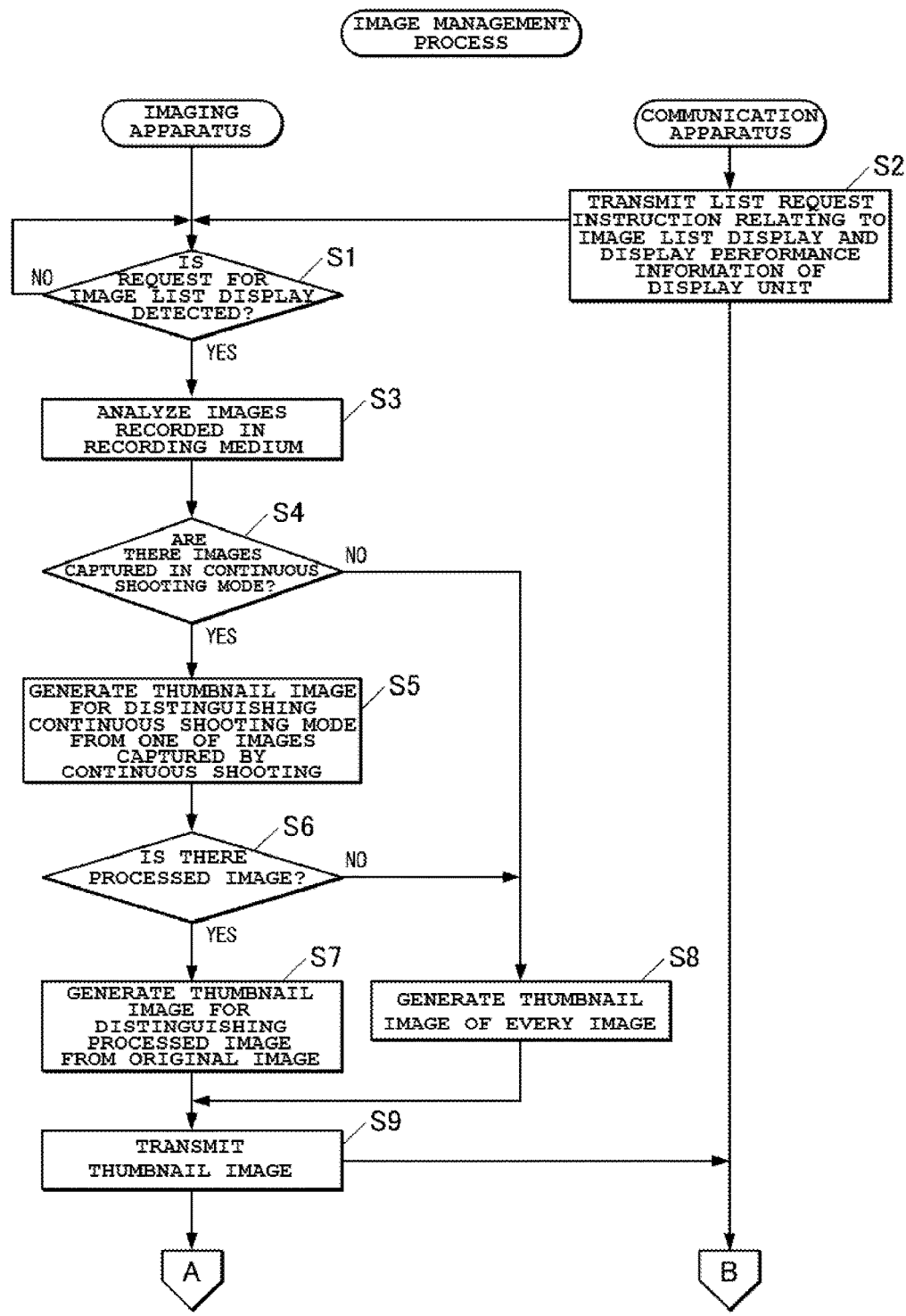
FIG. 4 is a flow chart showing an example of steps relating to an image management process by the image management system of FIG. 1.
Figure 5:
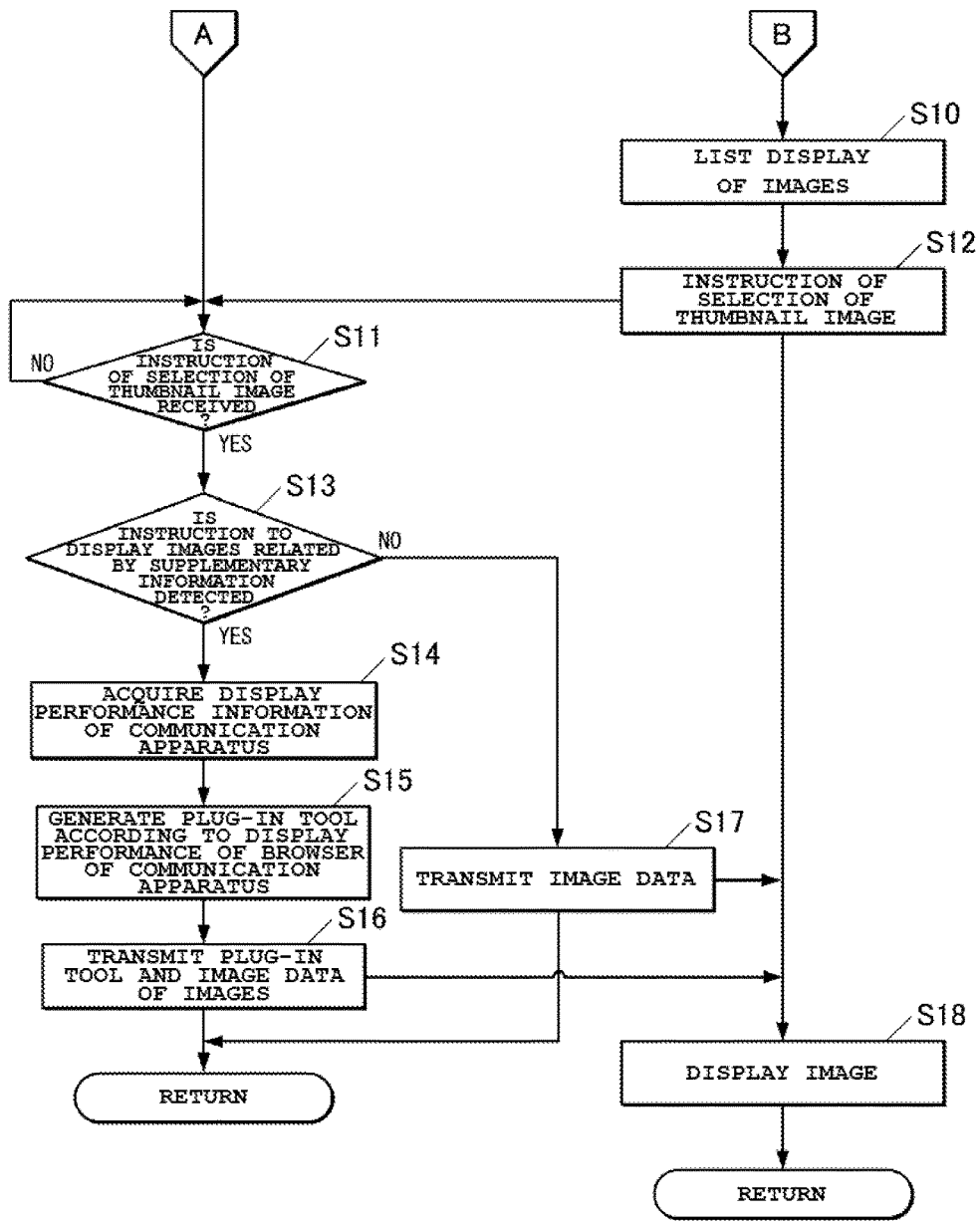
FIG. 5 shows a flow chart showing steps of the image management process subsequent to those of FIG. 4.

FIGS. 4 and 5 are flow charts showing an example of steps relating to the image management process by the image management system 100. FIG. 6 is a schematic diagram showing an example of a display screen of the communication apparatus 2.

The image management process which will be described below is a process performed by cooperation of the imaging apparatus 1 and the communication apparatus 2. It is supposed that the imaging apparatus 1 and the communication apparatus 2 are connected so as to communicate information with each other via the wireless communication line.

<Image Management Process>

As shown in FIG. 4, in the imaging apparatus 1, the request detecting unit 108*a* repeatedly determines whether or not a request for list display of a plurality of images recorded in the recording medium 105*a* is detected through the communication with the communication apparatus 2 by the wireless processing unit 107 (Step S1).

In other words, in the case that a list request instruction for requesting image list display is transmitted based on a predetermined manipulation of the manipulation input unit 206 of the communication apparatus 2 by a user from the wireless processing unit 203 of the communication apparatus 2 via the wireless PAN or the wireless LAN (Step S2) and the wireless processing unit 107 of the imaging apparatus 1 receives it, the request detecting unit 108*a* acquires the received list request instruction and detects a request for list display of images.

At this time, the communication apparatus 2 transmits the display performance information showing display performance of the display unit 205 with the list request instruction to the imaging apparatus 1. The display performance information is received by the wireless processing unit 107 of the imaging apparatus 1 and temporarily stored in the memory 102 of the imaging apparatus 1. Alternately, the display performance information may be transmitted when wireless connection of the imaging apparatus 1 and the communication apparatus 2 is established.

In the case that it is determined at Step S1 that no request for list display of the plurality of images is detected (Step S1; NO), the request detecting unit 108*a* repeatedly makes the determination on whether or not the request for list display of the plurality of images is detected at a predetermined time interval.

On the other hand, in the case that it is determined that the request for list display of the plurality of images is detected (Step S1; YES), the operation control unit 108 acquires image data of the plurality of images recorded in the recording medium 105*a* and analyzes a shooting mode of each image and/or a relationship with other images with reference to the supplementary information such as Exif tag information of image data of the image (Step S3).

Then, the image specifying unit 108*b* determines whether or not there are images captured in the continuous shooting mode based on the analysis of the plurality of images (Step S4). In other words, the image specifying unit 108*b* determines for each of the plurality of images recorded in the recording medium 105*a* whether or not there are other images recorded sequentially to the image from a point of time.

In the case that it is determined that there are images captured in the continuous shooting mode (Step S4; YES), the image specifying unit 108*b* specifies a plurality of images sequentially recorded from a point of time when shooting is performed in the continuous shooting mode. The information image generating unit 108*c* generates an icon image for thumbnail (the information image P1 in FIG. 6) for distinguishing the plurality of images sequentially recorded in the continuous shooting mode from other images using one of the plurality of images (Step S5).

Then, for each of the plurality of images recorded in the recording medium 105*a*, the image specifying unit 108*b* determines whether or not there is a processed image acquired by executing copy or a special process for the image (Step S6).

It is determined at Step S6 that there is the processed image (Step S6: YES), the image specifying unit 108*b* specifies one image which is the original image of the processed image. The information image generating unit 108*c* generates an icon image for thumbnail (the information image P2 in FIG. 6) for showing that the processed image is acquired by using the specified image as the original image from the original image (Step S7). In the case that there are a plurality of processed images acquired by performing a plurality of different kinds of processing to one original image, the information image generating unit 108c may generate an icon image for thumbnail for dealing with the images as a set.

On the other hand, it is determined at Step S4 that there are no images captured in the continuous shooting mode (Step S4: NO), the information image generating unit 108c generates an icon image for thumbnail of every image (Step S8).

Further, it is determined at Step S6 that there is no processed image (Step S6: NO), the operation control unit 108 moves the process to Step S8 and the information image generating unit 108c generates an icon image for thumbnail of every image (Step S8).

Then, the first transmission control unit 108d controls the wireless processing unit 107 to transmit image data of the icon images for thumbnail generated by the information image generating unit 108c to the communication apparatus 2 via the predetermined wireless communication line (Step S9).

As shown in FIG. 5, in the communication apparatus 2, the wireless processing unit 203 receives the image data of the icon images for thumbnail transmitted from the imaging apparatus 1. The display unit 205 acquires the received image data and list displays the image data in the display area (Step S10 in FIG. 6).

In the imaging apparatus 1, the wireless processing unit 107 repeatedly determines whether or not an instruction of selection of one of the icon images for thumbnail transmitted from the communication apparatus 2 is received (Step S11). In other words, in the case that an instruction of selection one of the icon images for thumbnail list displayed is transmitted based on a predetermined manipulation of the manipulation input unit 206 of the communication apparatus 2 by a user from the wireless processing unit 203 of the communication apparatus 2 via the wireless PAN or the wireless LAN (Step S12) and the wireless processing unit 107 of the imaging apparatus 1 receives it, the wireless processing unit 107 determines that an instruction of selection of the icon image for thumbnail is received (Step S11; YES).

In the case that it is determined at Step S11 that no instruction of selection of any icon image for thumbnail is received (Step S11; NO), the wireless processing unit 107 repeatedly makes the determination on whether or not an instruction of selection of an icon image for thumbnail is received at a predetermined time interval.

It is determined at Step S11 that the instruction of selection of the icon image for thumbnail is received (Step S11; YES), the instruction detecting unit 108e acquires the instruction of selection of the icon image for thumbnail received by the wireless processing unit 107. Based on whether or not the icon image for thumbnail is an information image showing that a plurality of images are related to each other (for example, the information image P1 or P2), the instruction detecting unit 108e determines whether or not an instruction to display the plurality of images is detected (Step S13).

In the case that it is determined that the instruction to display the plurality of images is detected (Step S13; YES), the information acquiring unit 108f acquires the display performance information received at Step S1 by the wireless processing unit 107 with the list request instruction from the memory 102 (Step S14). Based on the display performance information acquired by the information acquiring unit 108f, the control information generating unit 108g generates a plug-in tool (for example, a JAVA plug-in) which enables the plurality of images to be displayed in a distinguishable manner according to the display performance of the display unit 205 of the imaging apparatus 2 (Step S15).

The second transmission control unit 108h acquires the plug-in tool generated by the control information generating unit 108g and acquires the image data of the plurality of images related by the icon image for thumbnail from the recording medium 105a. Further, the second transmission control unit 108h controls the wireless processing unit 107 to transmit the acquired plug-in tool and image data of the plurality of images to the communication apparatus 2 via the predetermined wireless communication line (step S16).

On the other hand, in the case that it is determined at Step S13 that the instruction to display the plurality of images is not detected (Step S13; NO), the wireless processing unit 107 acquires data of one image corresponding to the received icon image for thumbnail from the recording medium 105a and transmits it to the communication apparatus 2 via the predetermined wireless communication line (step S17).

In the communication apparatus 2, in the case that the wireless processing unit 203 receives the image data transmitted from the imaging apparatus 1, the display unit 205 acquires the image data from the wireless processing unit 203 and displays it in the display area (Step S18). In the case that the wireless processing unit 203 receives image data of the plurality of images related to each other by the icon image for thumbnail, the display unit 205 displays the plurality of images in a distinguishable manner by using the received plug-in tool.

As above, according to the image management system 100 of the above embodiments, the imaging apparatus 1 specifies images related to each other by the supplementary information from a plurality of images, for example, captured by the imaging unit 103 and recorded in the recording medium 105a in the case that a request for list display of the plurality of images is detected, generates the information image (for example, the information image P1 or P2) showing that the specified images are related to each other, and transmits it to the communication apparatus 2 by the wireless processing unit 107. The communication apparatus 2 receives the information image and the display unit 205 displays the information image. Thus, the user can distinguish a plurality of images related to each other by the shooting mode (for example, the continuous shooting mode) or an image relating to another image. In other words, since the communication apparatus 2 uses the information image, it is possible to display the plurality of images recorded in the recording medium 105a so that the user can easily understand contents of the images.

More specifically, in the case that an instruction for performing a specific manipulation for the information image is detected, the display control information (for example, the plug-in tool) for displaying a plurality of images related to each other by the information image in a distinguishable manner is generated, the plurality of images related by the information image are transmitted to the communication apparatus 2 together with the generated display control information by the wireless processing unit 107. Thus, the communication apparatus 2 receives the display control information. Therefore, it is possible to display the plurality of images related to each other by the information image in a manner that can make the user distinguish them from other images irrespective of the display performance of the display unit 205 of the communication apparatus 2.

Especially, for example, by acquiring information showing the display performance of the communication apparatus 2 and generating the display control information based on the acquired information, it is display the plurality of images in a proper manner corresponding to the display performance of the display unit 205 of the communication apparatus 2. Thus, the user can more easily understand contents of the plurality of images recorded in the recording medium 105a.

Further, the present invention is not limited to the embodiments described above and various modification or design changes of the embodiments can be made without departing from the objects of the invention.

For example, according to the embodiments, the imaging apparatus 1 includes the control information generating unit 108g and the control information generating unit generates the display control information (for example, the plug-in tool) for displaying a plurality of images related to each other by the information image in a distinguishable manner. However, the configuration is merely an example and the present invention is not limited to this configuration. For example, information for instructing to generate the display control information may be correlated with a plurality of images and transmitted to the communication apparatus 2.

According to some embodiments, in the case that the display performance of the display unit 205 of the communication apparatus 2 is relatively high, the imaging apparatus 1 does not generate the display control information such as the plug-in tool and transmits control information for instructing the display unit 205 of the communication apparatus 2 to display images.

Further, for example, images related by the supplementary information may be previously specified from a plurality of images recorded in the recording medium 105a and then an information image for showing that the specified images are related to each other may be generated if a request for list display of the plurality of images is detected. Similarly, after images related by the supplementary information are specified from a plurality of images recorded in the recording medium 105a and an information image for showing that the images are related to each other is generated, the generated information image may be transmitted to the communication apparatus 2 by the wireless processing unit 107 if a request for list display of the plurality of images is detected.

According to the above embodiments, the imaging apparatus 1 detects an instruction for performing a specific manipulation for the information image (for example, the instruction to display a plurality of images). However, the configuration is merely an example and the present invention is not limited to this configuration. The imaging apparatus 1 does not necessarily include the instruction detecting unit 108e. In other words, the imaging apparatus 1 functioning as an image storing apparatus suffices to include at least the request detecting unit 108a, the image specifying unit 108b, the information image generating unit 108c, and the first transmission control unit 108d. Similarly, the imaging apparatus 1 does not necessarily include the information acquiring unit 108f, the control information generating unit 108g, and the second transmission control unit 108h.

In addition, the configurations of the imaging apparatus 1 according to the above embodiments are merely examples and the present invention is not limited to those configurations. For example, the wireless communication line is used as an example of the predetermined communication line, but a wired communication line for connecting the imaging apparatus 1 and the communication apparatus 2 by a cable can also be used.

Further, the imaging apparatus 1 is illustrated as an example of the image storing apparatus, but this is merely an example. The present invention is not limited to this and can be modified as necessary.

According to the embodiments, the functions of the first detecting means, the specifying means, the first generating means, and the first transmission control means are realized by driving the request detecting unit 108a, the image specifying unit 108b, the information image generating unit 108c, and the first transmission control unit 108d under the control of the central control unit 101. However, the present invention is not limited to the above and the functions may be realized by executing predetermined programs by the CPU of the central control unit 101.

In other words, a program including a detecting processing routine, a specifying processing routine, a generating processing routine, and a transmission control processing routine is stored in a program memory (not shown in the drawings). According to the detecting processing routine, the CPU of the central control unit 101 can function as a means for detecting a request for list display of a plurality of images recorded in a recording means from an external device through the communication by the communication means. According to the specifying processing routine, the CPU of the central control unit 101 can function as a means for specifying images related to each other by supplementary information from the plurality of images recorded in the recording means in the case that the request for list display is detected. According to the generating processing routine, the CPU of the central control unit 101 can function as a means for generating an information image for showing that the specified images are related to each other. According to the transmission control processing routine, the CPU of the central control unit 101 can function as a means for controlling the communication means to transmit the information image to the external device.

Similarly, the second detecting means, the second generating means, the second transmission control means, and the acquiring means may be realized by executing predetermined programs by the CPU of the central control unit 101.

In addition, a computer readable recording medium for recording the program for executing the respective processing can be a ROM, a hard disk, a non-volatile memory such as a flash memory, a portable storage medium such as a CD-ROM, or the like. A carrier wave can be used as a medium for providing program data through a predetermined communication line.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An image storing apparatus comprising:
    a recording medium configured to record a plurality of images and supplementary information corresponding to each of at least one of the plurality of images which shows a shooting mode or whether or not the image is related to one or more other images; and a processor which executes at least one program stored in a memory to control the apparatus to perform operations comprising:

performing communication with an external device via a predetermined communication line;

detecting a request for list display of the plurality of images recorded in the recording medium from the external device through the communication;

transmitting an information image based on the supplementary information to the external device in a case that the request for list display is detected;

detecting an instruction for performing a specific operation for the transmitted information image through the communication; and transmitting display control information for displaying a plurality of images related to each other by the information image in a distinguishable manner together with the plurality of images related to each other by the information image to the external device in a case that the instruction for performing the specific operation for the information image is detected.

2. The image storing apparatus of claim 1, the operations further comprising acquiring information showing display performance of the external device, wherein the display control information is based on the acquired information showing the display performance of the external device and is used to display the plurality of images related to each other by the information image in a distinguishable manner.

3. The image storing apparatus of claim 1, wherein the shooting mode comprises a continuous shooting mode.

4. The image storing apparatus of claim 1, further comprising an imaging device configured to generate an image by imaging a subject.

5. An image managing method performed by an image storing apparatus including a recording medium configured to record a plurality of images and supplementary information corresponding to each of at least one of the plurality of images which shows a shooting mode set at the time of shooting the image or whether or not the image is related to one or more other images, the method comprising:

performing communication with an external device via a predetermined communication line;

detecting a request for list display of the plurality of images recorded in the recording medium from the external device through the communication;

transmitting an information image based on the supplementary information to the external device by the communication in a case that the request for list display is detected;

detecting an instruction for performing a specific operation for the transmitted information image through the communication; and transmitting display control information for displaying a plurality of images related to each other by the information image in a distinguishable manner together with the plurality of images related to each other by the information image to the external device in a case that the instruction for performing the specific operation for the information image is detected.

6. A non-transitory computer-readable recording medium for recording a program readable by a computer included in an image storing apparatus including a recording medium configured to record a plurality of images and supplementary information corresponding to each of at least one of the plurality of images which shows a shooting mode set at the time of shooting the image or whether or not the image is related to one or more other images, the program being executable by the computer to control the apparatus to perform functions comprising:

communicating with an external device via a predetermined communication line;

detecting a request for list display of the plurality of images recorded in the recording medium from the external device through the communication;

transmitting an information image based on the supplementary information to the external device in a case that the the request for list display is detected;

detecting an instruction for performing a specific operation for the transmitted information image through the communication; and transmitting display control information for displaying a plurality of images related to each other by the information image in a distinguishable manner together with the plurality of images related to each other by the information image to the external device in a case that the instruction for performing the specific operation for the information image is detected.

* * * * *

UNITED STATES PATENT AND TRADEMARK OFFICE
CERTIFICATE OF CORRECTION

PATENT NO.        : 9,635,430 B2
APPLICATION NO.   : 14/804080
DATED             : April 25, 2017
INVENTOR(S)       : Shoichi Nagatomo It is certified that error appears in the above-identified patent and that said Letters Patent is hereby corrected as shown below:

In the Claims

Column 16, Line 35, after "the" delete "the".

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*